United States Patent [19]

Barrett

[11] 4,225,798
[45] Sep. 30, 1980

[54] PERMANENT MAGNET MOTOR

[76] Inventor: Edward L. Barrett, 506 Malden Ave., LaGrange Park, Ill. 60525

[21] Appl. No.: 869,317

[22] Filed: Jan. 13, 1978

Related U.S. Application Data

[63] Continuation-in-part of Ser. No. 638,591, Dec. 8, 1975, abandoned.

[51] Int. Cl.² ............................................. H02K 23/04
[52] U.S. Cl. .................................. 310/154; 310/68 C; 310/218; 310/239; 310/259
[58] Field of Search .................... 310/68 R, 49, 68 C, 310/43, 83, 40 MM, 154, 51, 42, 172, 168, 46, 242, 71, 249, 111, 89, 155, 254, 216, 258, 259, 218, 66; 49/340, 341, 349; 74/425, 424.5, 458

[56] References Cited

U.S. PATENT DOCUMENTS

| | | | |
|---|---|---|---|
| 2,312,848 | 3/1943 | Pezzillo | 310/89UX |
| 2,374,728 | 5/1945 | Bone | 310/154 |
| 2,682,005 | 6/1954 | Hemphill | 310/68 C |
| 3,234,417 | 2/1966 | Somers | 310/40 MM |
| 3,391,291 | 7/1968 | Benson | 310/89 |
| 3,463,951 | 8/1969 | Bauerle | 310/51 |
| 3,768,054 | 10/1973 | Neugebauer | 310/254 |
| 3,836,802 | 9/1974 | Parker | 310/154 |
| 3,876,892 | 4/1975 | Noodleman | 310/46 |

FOREIGN PATENT DOCUMENTS

| | | | |
|---|---|---|---|
| 1016815 | 10/1957 | Fed. Rep. of Germany | 310/154 |
| 2263167 | 6/1974 | Fed. Rep. of Germany | 310/154 |
| 2320794 | 11/1974 | Fed. Rep. of Germany | 310/66 |
| 1229199 | 9/1960 | France | 310/154 |
| 428939 | 5/1935 | United Kingdom | 310/154 |
| 542539 | 1/1942 | United Kingdom | 310/154 |

Primary Examiner—R. Skudy
Attorney, Agent, or Firm—Gary, Juettner & Pyle

[57] ABSTRACT

A dynamo-electric machine comprises an armature and a permanent magnet field structure including at least two permanent magnets and at least two field shoes. Each field shoe has an arcuate surface which forms one side of an air gap between the shoe and the armature, and is configured to direct magnetic flux from the permanent magnets to the arcuate surface in such a manner that the magnetic lines of force emanating from the arcuate surface and extending through the armature are of substantially uniform distribution and intensity, thereby providing a uniform magnetic field through the armature. This is accomplished by making the shoe of variable thickness to have a cross-sectional area varying substantially in proportion to the density of magnetic flux carried by the shoe at points therealong, so that the density of magnetic flux is substantially constant throughout the shoe and the shoe provides a substantially uniform distribution of magnetic flux across the arcuate surface and through the armature. To further enhance a uniform distribution of magnetic flux through the armature, the arcuate surface of the shoe is nonconcentric with the periphery of the armature to provide a nonuniform air gap having a reluctance which decreases with increasing distance from the magnets, thereby to encourage a flow of magnetic flux to areas of the arcuate surface remote from the magnets. The resulting construction provides a very thin D.C. motor especially adapted for mounting in the relatively narrow confines of a vehicle door to provide a powerful drive for electric window regulators for automotive vehicles.

2 Claims, 8 Drawing Figures

PERMANENT MAGNET MOTOR

BACKGROUND OF THE INVENTION

This application is a continuation-in-part application of co-pending application Ser. No. 638,591, filed Dec. 8, 1975, now abandoned.

The present invention relates to dynamo-electric machines, and in particular to a very thin yet powerful electric motor which is particularly useful in operating a window opening and closing apparatus mounted in a hollow vehicle door.

Vehicle doors in many automobiles are equipped with motorized mechanisms for raising and lowering a window pane mounted in the door. The space available within the door is relatively great in the length dimension but is relatively narrow and confining in the width dimension between the inside and outside door panels, which presents special problems in accommodating such mechanisms therein. This is especially true of the new compact and sub-compact vehicles.

In view of public interest in conserving energy, as well as recently enacted government regulations relating to minimum efficiencies (i.e., minimum mile per gallon requirements for automobiles), automobile manufacturers are redesigning their vehicles with a view to reducing their overall weight, thereby to improve their gas economy. At the same time they are attempting to provide more room in the passenger compartments, especially in the passenger compartments of compact vehicles, without increasing the overall outside widths of the automobiles. The only way in which compartment space may either be maintained or increased while at the same time decreasing or maintaining the overall width of the vehicle is to reduce the thickness of the doors.

Decreasing the thickness of the doors of an automobile which is to be equipped with manually operable window lift mechanisms does not present problems, as such mechanisms may readily be accommodated within the relatively narrow confines of the door. Where the vehicle is to be equipped with power windows, however, decreasing the thickness of the doors present special problems, since the spacing between the inside and outside panels of the door must be at least sufficient to accommodate an electric motor for operating the window lift mechanism.

Minimum requirements for a motor for operating a window lift mechanism are that the motor: (a) develop sufficient torque to raise and lower a large and heavy plate glass window, and (b) be essentially impervious to external contaminants such as detergents used in car wash establishments, which contaminants, should they enter the armature cavity of the motor, can easily destroy the motor. Such motors conventionally are cylindrical in shape, and are typically comprised of an armature and a permanent magnet field structure including a motor casing made from an iron tube of uniform thickness. The field structure also includes, in addition to the iron tube, two diametrically opposed and arcuately formed magnets bonded to the inside surface of the iron tube and which are concentric with the peripheral surface of the armature and form therewith air gaps of uniform dimension from end to end. In the resultant construction, the magnetic lines of force extend from one pole of one magnet through and outside of the iron tube to the opposite pole of the other magnet, and then across the air gaps and the armature to the one magnet.

Motors of such construction suffer impaired efficiency of operation. Not only does a portion of the flux travel outside of the motor casing, but the flux within the casing is at all points exposed to a constant thickness magnetic path irrespective of the density of the flux thereat. Further, the air gap which the flux must cross to pass through the armature is of uniform thickness over its entire area. The result is a variable distribution and variable intensity of the lines of flux passing through the armature and, in consequence, both a poor torque to power input ratio and a poor torque to size (and weight) ratio for the motor.

In addition, to seal such motors from external contaminants, they generally are confined within a separate, sealed, external housing, which usually serves no function other than protecting the motor against contaminants. The separate housing, of course, increases the overall diameter or size of the motor, and such motors having adequate torque to operate a window can hardly be accommodated within the hollow doors of even full size luxury automobiles.

In order that they will operate under the adverse condition of extremely low temperatures, at which time a layer of ice may be encrusted on the window panel, window regulator motors must develop relatively high torque, with the result that their current consumption is high. To keep the contact resistance of the motors low to avoid damaging arcing, the motor brushes must be contoured to match the arcuate surface of the commutator. Should the brushes rock in their guides upon reversal of the motor, proper interfacing of the brush and commutator is disturbed and severe arcing often occurs and damages the motor. Movement or rocking of the brushes within their guides may be minimized by providing sufficiently long brushes and guides, whereby adequate lateral support is provided for the brush upon reveral of the motor. Unfortunately, with motors of the conventional cylindrical shape there is not sufficient room for brushes and guides, as well as brush springs, of a length sufficient to satisfactorily minimize rocking of the brushes. In consequence, the brushes are moved from side to side in their guides as the direction of rotation of the motor is reversed, with the result that the life expectancy or maintenance interval of a conventional motor is significantly reduced. Also, relatively short brush springs result in relatively rapid decreases in the pressure of the brush against the commutator with brush wear, which also increases contact resistance and results in arcing.

To transfer the rotary output of the motor to the window regulator mechanism for operating the same, conventional practice contemplates machining a worm formation into the output shaft of the motor and meshing the same with a worm wheel for driving a pinion. Unfortunately, machining a worm formation into the shaft is an expensive procedure, and adds considerable cost to the motor.

OBJECTS OF THE INVENTION

A primary object of the present invention is to provide a relatively long but thin motor, having a field structure optimally designed to deliver to the periphery of an armature of the motor a strong and substantially uniform field of magnetic flux to maximize the power output of the motor, which may readily be accommodated within the narrow confines of a vehicle door for powering a window regulator mechanism.

Another object of the invention is to provide such a motor having field shoes which are of varying thickness, so that the density of a magnetic flux is substantially constant throughout the shoes.

A further object of the invention is to provide such a motor wherein air gaps formed between arcuate surfaces of the field shoes and a surface of an armature vary in width to provide a varying reluctance therealong and to encourage a uniform distribution of magnetic flux across the armature surface.

Yet another object of the invention is to provide such a motor having an improved and inexpensive worm formed on an output shaft thereof.

SUMMARY OF THE INVENTION

In accordance with the present invention, a dynamo-electric machine has an armature and a permanent magnet field structure which includes at least two permanent magnets and at least two field shoes. Each field shoe has an arcuate surface which forms one side of an air gap between the shoe and the armature, and is uniquely configured to direct magnetic flux from the permanent magnets to the arcuate surface in such a manner that the magnetic lines of force emanating from the arcuate surface and extending through the armature are uniformly distributed over the armature with substantially uniform intensity.

According to one facet of the invention, the uniform distribution of magnetic flux is enhanced by forming each field shoe to be of a thickness, and to have a cross-sectional area, which varies substantially in proportion to the density of magnetic flux carried by the shoe at points therealong. In this manner, the density of magnetic flux is substantially constant throughout the shoe, and the shoe provides a substantially uniform intensity distribution of magnetic flux across the armature surface.

According to another facet of the invention, the arcuate surface of the field shoe is formed to be non-concentric with the periphery of the armature to provide a varying width air gap therebetween. The air gap has a minimum width at a point most remote from the magnets, and progressively increases in width in directions toward the magnets. Consequently, the reluctance of the air gap progressively decreases from the points toward the magnets to points remote therefrom to encourage a flow of flux through the field shoe from the magnets to the points remote therefrom. This further enhances a substantially uniform intensity distribution of magnetic flux across the armature surface.

In a preferred embodiment, the machine has two magnets and two field shoes. Each field shoe comprises two arcuate dimensions, each the mirror image of the other, and has at its two ends a flat surface extending parallel to a diameter of the armature. The magnets are rectangular and abut flush against respective surfaces of the shoes, and the dimensions of the magnets abutting against the surfaces are greater than the dimensions of the magnets perpendicular thereto. The resulting structure provides a very thin motor in which substantial and uniform intensity flux is delivered to the armature. The motor may thus readily be accommodated within the relatively narrow confines of a vehicle door for powering a window regulator mechanism, and has a significantly improved power output for a given size and weight of motor.

Also, this construction facilitates fabrication of a very thin two pole motor inasmuch as the width dimension of the motor is comprised only of the diameter of the armature, the air gap spaces of minimum dimension, and the shoe dimensions of minimum thickness. The thinness of the design is further complemented by mounting the motor brushes parallel to the rectangular permanent magnets and along a diameter of the armature, whereby relatively long brushes and springs are accommodated to minimize lateral rocking of the brushes upon reversals of the motor, and to minimize the resistance and changes in the resistance between the brushes and a commutator of the motor.

For the particular end use here discussed, the machine further comprises a gear reducer output including worm gearing of unique design. In particular, an output shaft of the motor is provided with a worm formation comprising a helical groove formed in the outer surface of the shaft and a length of wire coiled in a helix and cemented into the groove. The wire efficiently and economically replaces the machined worm formation conventional to such motors, and meshes with a worm wheel for connecting the rotary output from the motor with a window regulator mechanism.

The foregoing and other objects, advantages and features of the invention will become apparent from a consideration of the following detailed description, when taken in conjunction with the accompanying drawings.

DETAILED DESCRIPTION

Figure 1:
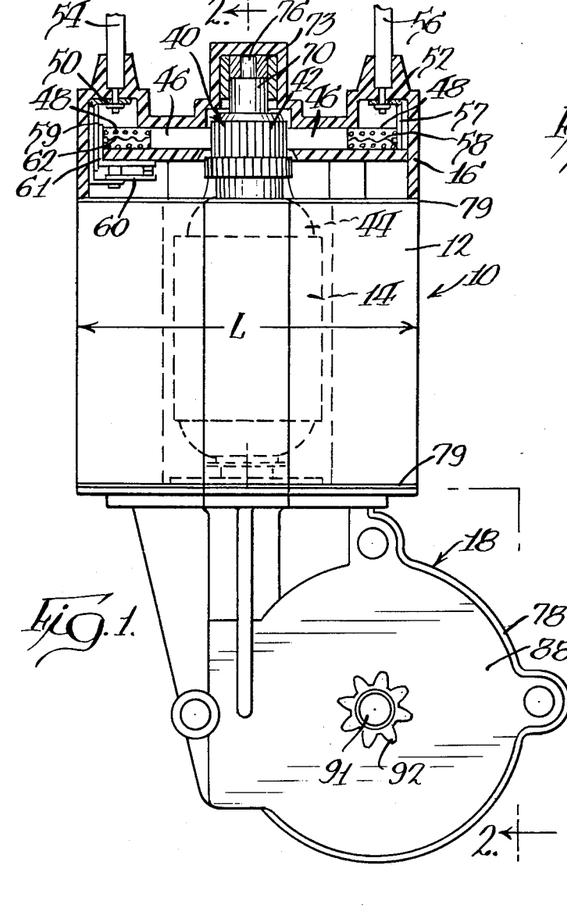
FIG. 1 is a side elevation view, partly in cross-section, of a dynamo-electric machine constructed in accordance with the teachings of the present invention, showing a gear reducer associated with the machine and viewing the machine across a long dimension thereof.

Referring to the drawings in greater detail, a dynamo-electric machine constructed in accordance with the teachings of the present invention is illustrated in FIG. 1 and generally identified by the reference numeral 10. The machine is specifically adapted for use as a D.C. motor in a window pane raising and lowering apparatus or window regulator mounted within a hollow vehicle door, and includes a field structure 12, an armature 14 mounted within the field structure, an end cap 16 mounted on one end of the field structure, and a gear reducer 18 is mounted on an opposite end of the field structure. By virtue of its particular construction, the motor is very thin for easy accommodation within the relatively narrow confines of a vehicle door, and provides a significantly improved power output for a given size and weight of motor.

Figure 3:
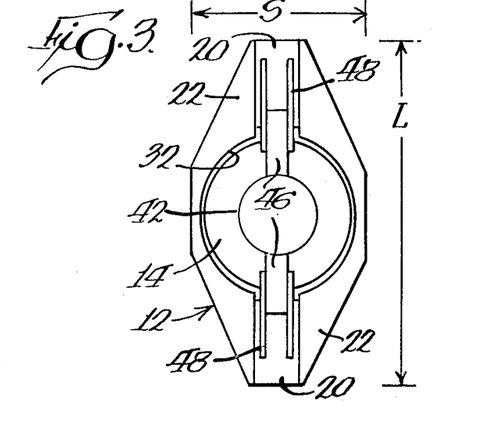
FIG. 3 is a fragmentary end view taken substantially along the lines 3—3 of FIG. 2, showing a field structure of the machine configured in accordance with one embodiment of the invention.
Figure 4:
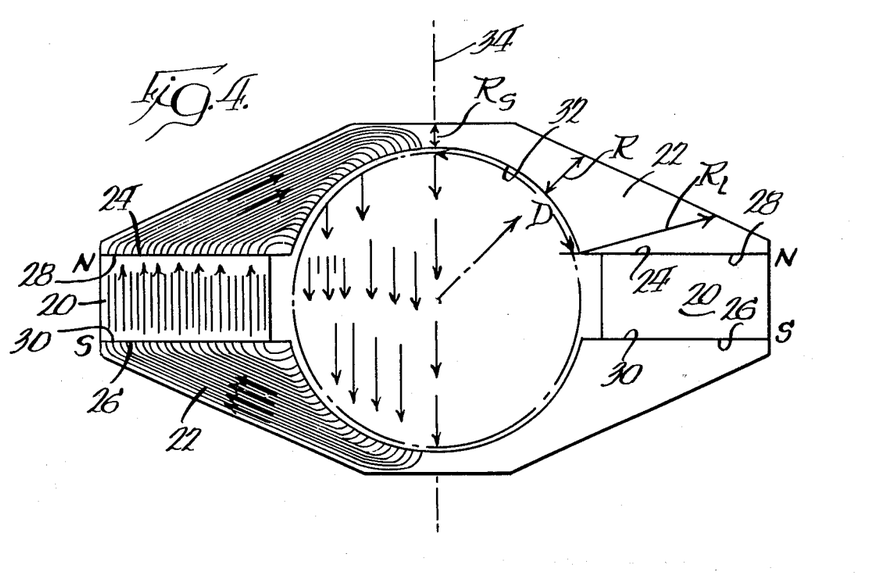
FIG. 4 is an enlarged view of the field structure shown in FIG. 3 with the armature being shown in dashed lines, illustrating the flux distribution in a portion of a field shoe of the field structure.

As is best shown in FIGS. 3 and 4, in one embodiment of the invention the field structure 12 includes two identical permanent magnets 20 and two identical ferromagnetic material or iron field shoes 22. Each of the magnets is generally rectangular in cross section, has a thickness dimension which is small relative to its width, is elongate and preferably is made of a ceramic material. Also, each magnet has oppositely facing flat side surfaces 24 and 26 which extend axially of the machine parallel to a diameter of the armature 14. As shown, the magnets are magnetized with the surface 24 having one polarity and the surface 26 having the opposite polarity.

Each of the field shoes 22 has a generally C-shaped cross section which extends between two respective axially extending flat and coplanar surfaces 28 and 30 which are adapted to mate with respective ones of the magnet surfaces 24 and 26. More specifically, the field shoes are fixed or bonded to the magnets 20 such as by means of a thin film of epoxy cement applied between the surfaces 28 and 30 of the field shoes and the respective mating polarized surfaces of the magnets, whereby the field structure defines a unitary, peripherally sealed, generally cylindrical housing for the armature, without need for a separate housing. The flux path thus extends from one pole of each magnet arcuately through the adjacent half of the contiguous shoe, transversely through the armature, and arcuately back through the adjacent half of the other shoe to the other pole of the magnet, without any flux crossing over between adjacent halves of each shoe.

Extending between the flat surfaces of each field shoe is an arcuate surface 32 which forms one side of an air gap between the shoe and the armature. In the following description of the construction of the field shoes, reference is made to a plane 34 which includes a diameter of the armature, and which bisects the arcuate surfaces approximately midway between the magnets and extends axially of the machine normal to the plane of FIG. 4. The portions of each field shoe to opposite sides of the plane are mirror images of each other, and therefore only one of the portions will be described in detail.

Figure 2:
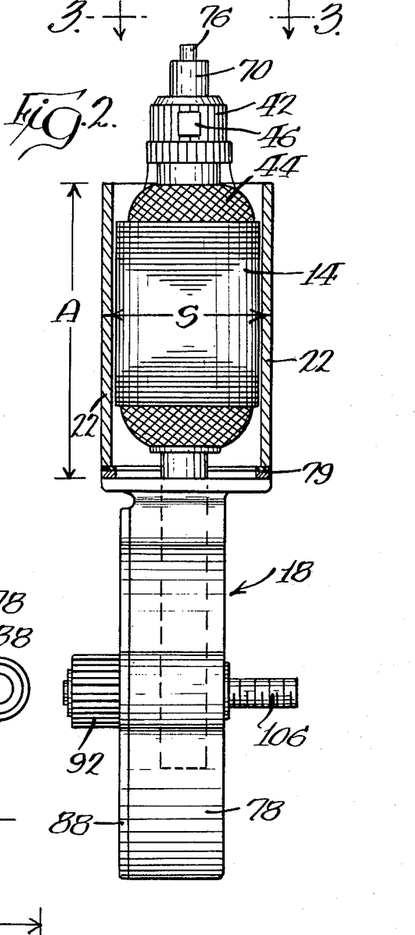
FIG. 2 is a side elevational view, partly in cross-section, across a short dimension of the machine, and taken substantially along the lines 2—2 of FIG. 1.

The configuration of a portion of the upper field shoe between a flat surface 28 and the plane 34 can be better understood with reference to three dimensions of the field shoe, namely, an axial dimension A (FIG. 2) extending axially of the machine, an arcuate dimension D extending between the flat surface 28 and the plane and a radial dimension R extending from the arcuate surface outwardly of the armature axis. According to one facet of the invention, the field shoe has a varying radial dimension R which progressively decreases from a maximum radial dimension or thickness $R_L$ in the area of the arcuate surface adjacent the flat axially extending surface 28 to a minimum radial dimension or thickness $R_S$ in the area of the arcuate surface adjacent the plane.

With this varying radial thickness of the field shoes, the cross-sectional areas of the shoes are compatible with the amount of flux existing along the path of the flux, and saturation of the shoes or portions thereof is avoided. More specifically, each field shoe progressively increases in thickness to both sides of the plane 34 from the area adjacent the plane to areas adjacent to points whereat the arcuate surface 32 meets the flat surfaces 28, and then progressively decreases in thickness from those points to outer ends of the shoe, such that the thickness of the shoe, and therefore the cross-sectional area thereof, varies substantially in proportion to the density of magnetic flux carried by the shoe at points therealong. As a result, the density of magnetic flux is substantially constant throughout the shoe, and the field shoe provides a substantially uniform intensity distribution of magnetic flux across the armature surface.

Considering the thickness variations of the field shoe from its outer ends inward, and as illustrated by the lines of flux in the upper left hand of the field structure shown in FIG. 4, at each of its ends the shoe is of relatively small cross-section, since at those points it is required to conduct only that amount of flux which emanates from the outermost portions of the magnets. As a matter of fact, at its very outermost ends the shoe could be tapered to a point, since the flux required to be conducted by the shoe thereat is substantially zero, but for the purpose of providing structural rigidity for the motor the ends of the shoe are formed with a finite thickness dimension. Then, in directions inward from its ends, the field shoe receives and accumulates lines of magnetic flux from succeeding portions of the magnets and, in order to present a uniform reluctance path to the lines of flux and to provide a uniform flux density in the shoe, the shoe progressively increases in cross section in conformity with and in proportion to the amount of flux existing at various points therein. Thereafter, from the point whereat the magnets end and additional flux does not enter the shoe, and whereat the shoe begins to form the arcuate surface which defines with the armature periphery the air gap, and to the area adjacent the plane midway between the magnets, the cross-sectional area of the shoe progressively decreases, in accordance with the remaining lines of flux therein as some of the lines of flux leave the shoe and pass into and through the armature, in order to continue to present a substantially uniform reluctance path to the lines of flux and to maintain a substantially constant density of the magnetic flux throughout the field shoe. Similar to the very ends of the shoe the very center thereof, at the plane, theoretically requires no thickness, since there is no flux required to be carried by the field shoe thereat, but in practice the shoe has limited but sufficient thickness at its center to provide structural rigidity and support for the motor.

The improved result obtained with the field structure constructed in the manner just described is that each field shoe efficiently directs magnetic flux from the permanent magnets 20 to the arcuate surface 32 in such a manner that the magnetic lines of force emanating from the arcuate surface and extending through the armature 14 are uniformly distributed and of sustantially uniform intensity. Also, very little, if any, of the flux flows outside of the field shoe. In consequence, the field structure of the motor is extremely thin and provides a very powerful motor for a given size and weight of the motor.

To further assist in the establishment of a uniform flux distribution through the armature, in accordance with another facet of the invention a nonuniform or varying air gap is provided between the arcuate surface 32 and the surface of the armature 14.

In this respect, the axis about which the arcuate surface 32 is generated is noncoaxial with the axis of the armature, and the arcuate surface is positioned so that the width of the air gap is greatest in the area of the surface adjacent either of the flat, axially extending surfaces 28 and 30, and progressively decreases along the arcuate surface to a minimum width in the area of the plane 34, as best shown in FIG. 4. More specifically, the arcuate surface is non-concentric with the periphery of the armature and defines therewith an air gap which progressively increases in width or thickness to both sides of the plane, substantially in proportion to the length of the field shoe therealong, from a minimum dimension in the area of the plane to a greater dimension in the areas adjacent the magnets whereat the arcuate surface meets the flat surfaces of the field shoe. As a result, the reluctance of the air gap from the areas adjacent the magnets to the area adjacent the plane progressively decreases to encourage flow of flux through the field shoe from the magnets to the area adjacent the plane and to provide and further enhance a substantially uniform intensity distribution of magnetic flux across the armature surface.

In consequence of the variations in the width of the air gap, some of the flux in the field shoe adjacent the magnets is encouraged to travel further along the shoe, and fully to the center of the shoe adjacent the plane 34, before crossing the air gap and entering the armature. Thus, high density flux concentrations in the air gap adjacent the magnets are prevented, and substantially uniform intensity distribution of flux across the armature periphery is obtained. In combination with the uniquely changing thickness of the field shoes, the air gap provides an optimum flux distribution across the armature surface, thereby fully maximizing the power output of the motor for a given size and weight of, the power input to, the motor.

Figure 8:
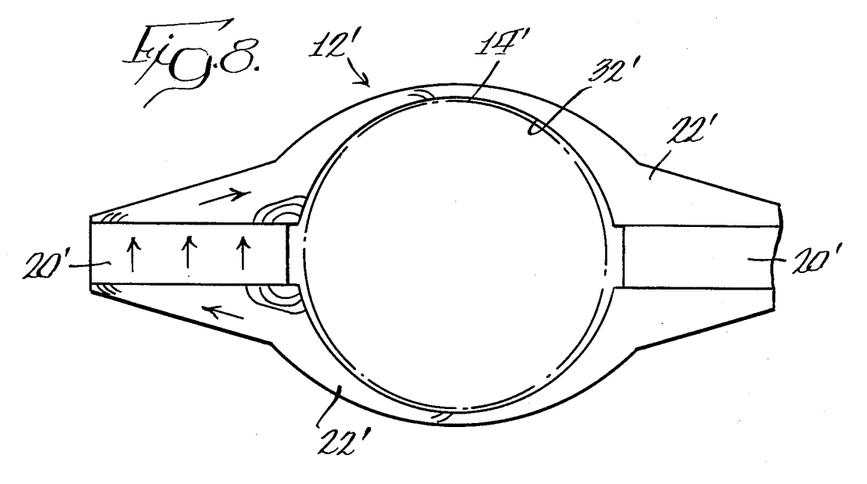
FIG. 8 is similar to FIG. 4, and shows a field structure of the machine configured in accordance with another embodiment of the invention.

FIG. 8 of the drawings illustrates a field structure, indicated generally at 12', configured in accordance with another embodiment of the invention. The field structure may be used in place of that shown in FIGS. 3 and 4, and includes a pair of field shoes 22' and a pair of magnets 20' joined therewith, which together form a peripherally sealed cavity for an armature 14'. The primary difference between the two field structures is that in the field structure of FIG. 8 the center outer surfaces of the shoes about the armature are generally arcuate, whereas the corresponding surfaces of the shoes in FIGS. 3 and 4 are comprised of flat surfaces.

The main advantage of the field structure of FIG. 8 is that each field shoe 22' may more readily be manufactured to have a varying thickness or cross-sectional area which is more closely in proportion to the density of magnetic flux at points therealong, whereby minimum amounts of material may be used in the fabrication of the shoes to provide a field structure of reduced and minimum weight. In all other respects, however, the field shoes 22' are generally similar to and provide like advantages with the shoes 22 of FIGS. 3 and 4. For example, the shoes 22' are of a thickness along their entire length in proportion to the density of magnetic flux carried at points therealong, and define with the armature 14' a variable width air gap having a reluctance which progressively decreases with increasing distances from the magnets and to a point midway therebetween, whereby the shoes provide a uniform intensity distribution of flux across the armature surface.

A dynamo-electric machine or motor with a field structure constructed in the manner described provides a number of advantages. First, and as stated, the varying thicknesses flux path provided by the shoes enables most if not all of the flux to flow solely within the shoes, and little if any of the flux flows outside of the shoes and through the air, which has a much higher reluctance than the iron from which the field shoes are made. This provides for more efficient operation of the motor and provides a very favorable torque output to weight (or size) ratio. Additionally, machining of field shoes which are made of soft iron is much easier and less expensive than the grinding of permanent magnets, and the manufacture of permanent magnets having flat surfaces is much less expensive than the construction of permanent magnets with arcuate surfaces.

Another advantage obtained by constructing the field shoes in the maner described, and with the dimensions of the magnets abutting against the flat surfaces of the shoes being greater than the dimensions of the magnets perpendicular thereto, is that the motor-machine is then provided with a very short dimension S (FIG. 3) along a diameter of the armature 14 lying in the plane 34 in an area where the field shoes and the air gap are thinnest in the radial dimension R, and a relatively longer dimension L which extends in a direction normal to the plane. The short dimension S enables the motor to be easily mounted within a relatively narrow hollow space for a vehicle door in a critical space dimension between the inside and outside panels of the door.

The long dimension L also provides advantages. In this respect the motor 10 includes a commutator assembly 40 mounted within the end cap 16. The commutator assembly includes a commutator 42 forming part of the armature and connected to an armature winding 44, two spring-biased brushes 46, and two brush holders 48. The long dimension L permits the brushes, the brush holders and the brush biasing springs to be relatively long and situated adjacent the ends of the magnets 20, with the brushes and the brush holders extending generally along the long dimension. Obviously, a long brush will have a longer life than a short brush, and a relatively long brush holder is more effective in holding a brush in place and in preventing twisting, rocking or lateral movement of the brush. This is particularly important in reversible electric motors as are required for window regulators and other comparable services, since rocking of the brushes would otherwise cause arcing between the brush and the commutator, resulting in relatively rapid wear of the brushes and commutator and an increased electrical resistance therebetween. Further, due to the longevity of use in such service, the longer brushes assure greater service life, and the longer brush biasing springs maintain a constant pressure on the brushes as they wear down. In this way, good electrical contact is maintained between each brush and the commutator, resulting in less arcing and pitting of the commutator and the brushes, and in a relatively constant resistance between the brushes and the commutator. This, of course, contributes further to longer brush and commutator life.

The end cap 16 is made of insulating material and has two electrical terminals 50 and 52 mounted therein. Each terminal has a respective lead wire 54 and 56 connected thereto and sealed within the end cap, as shown in FIG. 1, for applying a D.C. voltage to the motor. The terminal 52 is electrically connected to the brush 46 via a wire 57 and pigtail 58. The terminal 50 is connected by a wire 59 to a bi-metallic thermal overload protector 60, which in turn is connected via a wire 61 and pigtail 62 to the brush 46, the wires 59 and 61 being insulated from one another. With this arrangement, if the motor should overheat for any reason, the overload protector will open and interrupt the application of power to the motor. Because of the high torque of the motor, the current drawn is relatively high. The motor will perform satisfactorily on intermittent duty, but not in the event of continuous operation of the motor, as when a child "plays" with the actuating switches for the power windows. In such event, if the temperature inside the motor case approaches a dangerous value, the protector opens the motor circuit and holds it open until the motor cools to a safe operating temperature.

Figures 5, 6:
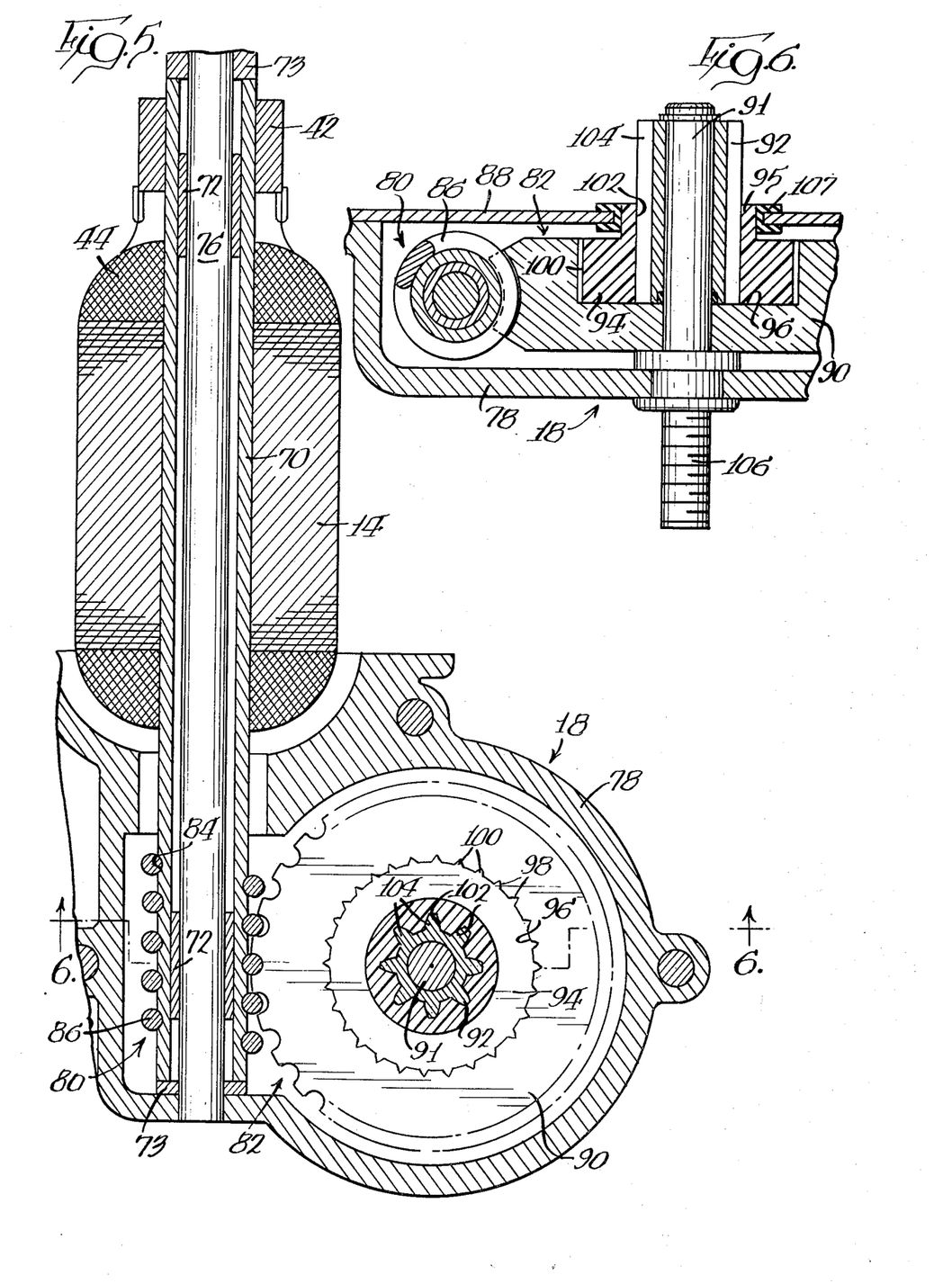
FIG. 5 is a fragmentary vertical section view of the machine across the long dimension thereof, showing both the construction and mounting of the armature on a sleeve and a worm formation and associated worm wheel which together form the gear reducer.
FIG. 6 is a fragmentary horizontal section view of the gear reducer taken substantially along the lines 6—6 of FIG. 5.

Referring to FIG. 5, the armature 14 is mounted on a hollow sleeve 70 of a relatively hard material, which functions as the motor output shaft and is rotatably journaled by a pair of sleeve bearings 72 on a nonrotatable shaft 76. The shaft 76 is fixed at its upper end in the end cap 16 and at its lower end in a housing or enclosure 78 for the gear reducer 18, and a pair of thrust bearings 73 are mounted on the shaft between the upper end of the sleeve and the end cap 16 and between the lower end of the sleeve and the casing 78 for rotatably supporting the sleeve and the components thereon in a fixed vertical position. The above-described armature assembly including the hollow sleeve rotatably mounted by means of bearings on a fixed shaft is simple, low in cost, small in size and greatly facilitates bearing alignment.

The design of the motor further facilitates economy of construction in that a separate housing for the motor is not required, since the field structure 12, the end cap 16, and the enclosure 78 for the gear reducer 18 (or other suitable enclosure or cap) perform that function. Specifically, the two field shoes 22 are bonded to the magnets 20 and form therewith a peripherally sealed generally elliptical closure having a sealed generally cylindrical cavity for the armature. In addition, the axial dimensions of the field shoes and the magnets are equal, and the same together define planar mounting surfaces at the two axial ends thereof which are adapted for sealing reception of end closures without need for a separate housing. The end cap 16 is a closed member having the leads 54 and 56 sealed therein, and is sealed to one end face of the field structure. To complete the closure of the motor, the enclosure 78 for the gear reducer is likewise a closed and sealed member, and is sealingly secured to the other end face of the field structure. To ensure sealing, gaskets 79 may be inserted between the two flat end faces of the field structure and the respective associated caps or enclosures. The assembly is suitably effected by threading a plurality of bolts, e.g., four, through each of the end cap 16 and a mounting flange of the enclosure 78 into tapped holes in the respective ends of the field shoes.

Thus, the armature and its bearings as well as the commutator assembly are not only enclosed, but are actually sealed within stationary components of the motor without need for a separate housing as in conventional motors. The provision of a sealed enclosure for the armature and its bearings, and for the commutator assembly, is very important in a motor intended to operate a vehicle window regulator. In vehicle wash racks, detergents are used which seep into the space occupied by such motors, between the door panels. If detergent gets into the armature cavity, serious damage results. Thus, sealing of the armature cavity is highly advantageous, especially considering that it is accomplished without the additional bulk and expense of a separate housing.

Referring to FIGS. 5 and 6, the gear reducer 18 includes a novel worm formation 80 on the lower end of the sleeve 70, and a worm wheel assembly 82. The worm formation includes a shallow helical groove or thread 84 formed in the outer surface of the hard material sleeve, and a length of wire 86 coiled in a helix and threaded or fit into the helical groove. The wire is fixed or bonded in the groove to the outer surface of the sleeve, such as with an epoxy cement. This construction is the equivalent of and far less expensive than a machined or ground and polished worm. Also, the worm formation has the advantage that the pitch of the worm formed by the wire 86 is constant, since one convolution may not move axially with respect to an adjacent convolution inasmuch as they are anchored in the groove 84.

The worm wheel assembly 82 includes a worm wheel 90 mounted for meshing engagement with the worm formation 80, a pinion 92 mounted separate from but co-axially with the worm wheel, and an annular resilient member 94 interposed and fixed between the worm wheel and the pinion for absorbing shocks applied to the gear reducer 18. The pinion 92 extends to the exterior of the enclosure 78 for conventional meshed driving engagement with the quadrant gear of a window regulator. For this purpose, the motor and gear reducer assembly can be disposed at any desired or necessary angle in the door, inasmuch as the motor need not be mounted vertically.

As best shown in FIG. 6, the worm wheel 90 has an annular cavity 96 and grooves 98 formed in an outer wall surface of the cavity. The resilient member 94, which may be made of a rubberlike material, has teeth 100 formed on its outer cylindrical surface which are adapted to fit into the grooves 98 to fix the annular member in the cavity. The resilient member also has grooves 102 formed on its inner cylindrical surface for mating engagement with teeth 104 on the pinion 92. In this way, the resilient member is firmly fixed to and between the worm wheel and the pinion to absorb, cushion and isolate shock loading, to protect the motor from damage and to reduce noise at the meshing point of the pinion and the gear quadrant of the regulator mechanism. Further, since the shock-absorbing member conformably and sealingly mates with the teeth on the pinion, the pinion can be formed most economically, even from extruded shock.

The pinion 92 and the worm wheel 90 are individually journalled on a stationary shaft 91 secured to one wall of the enclosure 78. Because of its fixed mounting, the shaft can be extended outwardly from the enclosure and threaded at its outer end to form a very convenient pivotal mounting stud 106 for the motor and gear reducer assembly. A wall 88 of the enclosure opposite that to which the shaft is secured is preferably removable to facilitate assembly, and if necessary subsequent servicing, of the gear reducer. The wall is suitably sealed in any conventional manner to the body of the enclosure 78 and to the resilient shock absorbing member 94 to render the enclosure water-tight. For this purpose, the resilient member 94 (which is effectively sealed to the pinion 92 by mated engagement with the teeth 104 thereof) is provided with a cylindrical extension 95 which projects through a coaxial hole in the wall 88 in sealing engagement with a seal 107 retained on the wall about said hold. Thus, the armature cavity is maintained sealed with the advantages above described.

Figure 7:
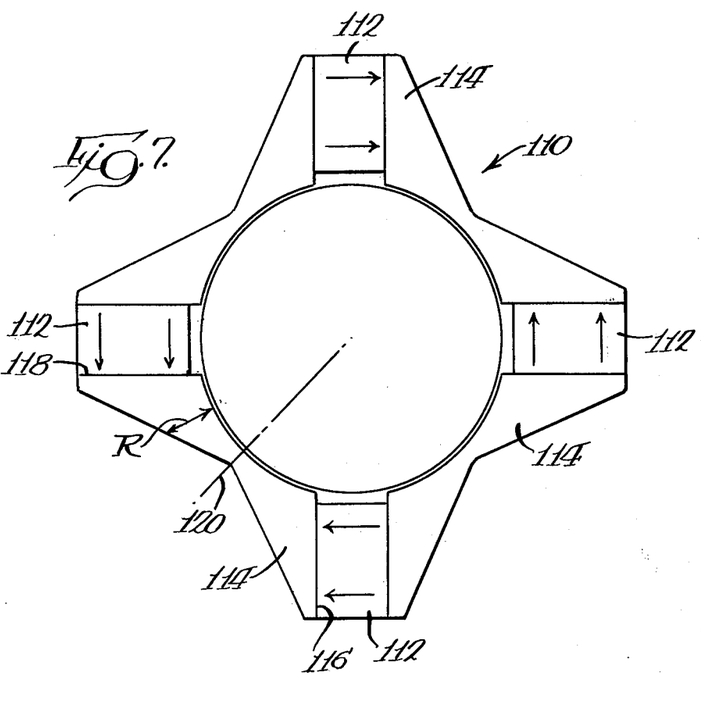
FIG. 7 is an end view of a four-pole field structure constructed in accordance with the teachings of the present invention, showing an armature in dashed lines.

While the novel construction of the dynamo-electric machine illustrated in FIGS. 1–6 and 8 has been described with reference to a two-pole machine, it is to be understood that the teachings of the invention can also be utilized in a four-pole machine. In this respect, a four-pole field structure made in accordance with the teaching of the present invention is illustrated in FIG. 7 and generally identified by the reference numeral 110. The field structure includes four permanent magnets 112 substantially identical to the magnets 20 and four field shoes 114. Each of the field shoes has two flat surfaces 116 and 118 which are adapted to mate with respective flat side surfaces of two of the magnets. In this embodiment, the flat surfaces of the shoes are not coplanar, but instead lie in planes which are normal to each other. Nevertheless, in accordance with the teachings of the present invention, the radial dimension R of the field shoe 114 varies from a maximum dimension adjacent the flat surfaces 116 and 118 to a minimum dimension in the area of a plane 120 located midway between the flat surfaces and disposed at an angle of 45 degrees with respect to the surfaces. Specifically, the thickness of the field shoe progressively increases to each side of the plane to the points whereat the arcuate surface meets the flat surfaces, and then progressively decreases to outer ends of the shoe. In this manner, the density of the magnetic flux remains substantially constant throughout the shoe, the shoe presents a relatively uniform reluctance throughout to the magnetic flux, and a uniform intensity distribution of magnetic flux is provided across the armature surface.

Also in accordance with the earlier description, each shoe has an arcuate surface juxtaposed to the armature which is of non-concentric configuration so as to provide a variable air gap having its greatest width adjacent the magnets 112 and a minimum width adjacent the plane 120. More particularly, the air gap is such that its reluctance gradually decreases from a maximum value at the points whereat the arcuate surface meets the flat surfaces to a minimum value in the area adjacent the plane. Consequently, flux from each of the magnets is encouraged to travel through the shoe toward the plane and is efficiently directed with uniform distribution and substantially uniform intensity across the surface of the armature.

While embodiments of the invention have been described in detail, it is understood that various modifications and other embodiments thereof may be devised by one skilled in the art without departing from the spirit and the scope of the invention, as defined in the appended claims.

What is claimed is:

1. A dynamo-electric machine comprising an armature and a permanent magnet field structure including two permanent magnets and two field shoes each having two portions which mate with associated ones of said magnets and an arcuate surface between said portions which forms one side of an air gap between the field shoe and the armature, the improvement residing in the field shoes being configured to direct magnetic flux from the permanent magnets associated therewith to said arcuate surfaces in such a manner that the magnetic lines of force emanating from the arcuate surfaces and extending through the armature are uniformly distributed over the armature with substantially uniform intensity, said arcuate surface of each said field shoe extending from the portions of said field shoe which mate with said magnets to a plane situated approximately midway between said magnets, each field shoe progressively increasing in thickness to both sides of said plane from the area adjacent said plane to adjacent said portions of the field shoe which mate with said magnets, and then progressively decreasing in thickness from those portions to ends of the field shoe, the thickness of the field shoe between said area adjacent said plane and the ends of the field shoe, and therefore the cross-sectional area thereof, varying substantially in proportion to the density of magnetic flux carried by the field shoe at points therealong, so that the density of magnetic flux is substantially constant throughout the field shoe and the field shoe provides a substantially uniform intensity distribution of magnetic flux across said armature surface, said arcuate dimension of each said field shoe being nonconcentric with the periphery of said armature and defining between said arcuate surface and said armature periphery an air gap which progressively increases in width to both sides of said plane from a minimum dimension in the area adjacent said plane to a greater dimension in the areas adjacent said portions of the field shoe which mate with said magnets, said width of said air gap from said plane to said mating portions increasing substantially in accordance with the length of the field shoe therealong, whereby the reluctance of said air gap from said areas adjacent said mating portions to said area adjacent said plane progressively decreases to encourage a flow of flux through said field shoe from said areas adjacent said mating portions to said area adjacent said plane, the varying width of said air gap assisting in the establishment of a uniform flux distribution through the armature, each portion of said arcuate surface of each said field shoe to each side of said plane being the mirror image of the other, each shoe having at its two ends a flat surface extending parallel to a diameter of the armature, intersecting the arcuate surface, being substantially parallel to the corresponding surfaces of the other shoe and comprising said portions of mating with said magnets, said magnets being rectangular and abutting flush against respective flat surfaces of said shoes, the dimensions of said magnets abutting against said surfaces and along a diameter of the armature being greater than the dimensions of said magnets perpendicular to said surfaces, said magnets being elongate in the directions parallel to said surfaces of said shoes, and said magnets and shoes defining a field structure that is relatively elongate in the direction parallel to the surfaces of said shoes and to a diameter of the armature and of minimum width in the direction transverse to the surfaces of said shoes, and including a commutator at one axial end of said armature, a brush assembly mounted at the corresponding end of said field structure, said brush assembly comprising two brushes and two brush holders mounted along the long dimension of said structure parallel to said surfaces of said shoes and to a diameter of the armature with each brush and brush holder situated adjacent and parallel to a respective one of said magnets, the dimension of each said magnet in the long dimension of said structure accommodating a relatively long brush and a relatively long brush holder, two electrical terminals, and a bi-metallic overload protector connected in series circuit between one of said brushes and one of said electrical terminals.

2. A dynamo-electric machine comprising an armature and a permanent magnet field structure including at least two permanent magnets and at least two field shoes each having two portions associated with said magnets and an arcuate surface between said portions which forms one side of an air gap between the field shoe and the armature, the improvement residing in the field shoes being configured to direct magnetic flux from the permanent magnets associated therewith to said arcuate surfaces in such a manner that the magnetic lines of force emanating from the arcuate surfaces and extending through the armature are uniformly distributed over the armature with substantially uniform intensity, said arcuate surface of each said field shoe extending from the portions of said field shoe associated with said magnets to a plane situated approximately midway between said magnets, each field shoe progressively increasing in thickness to both sides of said plane from the area adjacent said plane to adjacent said portions of the field shoe associated with said magnets, and then progressively decreasing in thickness from those portions to ends of the field shoe, the thickness of the field shoe between said area adjacent said plane and the ends of the field shoe, and therefore the cross-sectional area thereof, varying substantially in proportion to the density of magnetic flux carried by the field shoe at points therealong, so that the density of magnetic flux is substantially constant throughout the field shoe and the field shoe provides a substantially uniform intensity distribution of magnetic flux across said armature surface, wherein said arcuate dimension of each said field shoe is nonconcentric with the periphery of said armature and defines between said arcuate surface and said armature periphery an air gap which progressively increases in width to both sides of said plane from a minimum dimension in the area adjacent said plane to a greater dimension in the areas adjacent said portions of the field shoe associated with said magnets, said with of said air gap from said plane to said portions associated with said magnets increasing substantially in accordance with the length of the field shoes therealong, whereby the reluctance of said air gap from said areas adjacent said portions to said area adjacent said plane progressively decreases to encourage a flow of flux through said field shoe from said areas adjacent said portions to said area adjacent said plane, the varying width of said air gap assisting in the establishment of a uniform flux distribution through the armature, wherein each portion of said arcuate surface of each said field shoe to each side of said plane is the mirror image of the other, each shoe having at its two ends a flat surface extending parallel to a diameter of the armature and comprising said portions associated with said magnets, said magnets being rectangular and abutting flush against respective flat surfaces of said shoes, the dimensions of said magnets abutting against said surfaces and along a diameter of the armature being greater than the dimensions of said magnets perpendicular to said surfaces, and including seal means between said surfaces and said magnets for sealing and bonding said magnets with and to said field shoes to form a sealed substantially cylindrical cavity for said armature, including two magnets spaced equally from one another and two field shoes extending between said magnets, the flat surfaces of each shoe intersecting the arcuate surface thereof and being substantially coplanar and parallel to the corresponding surfaces of the other shoe, wherein said magnets are elongate in the directions parallel to said surfaces of said shoes, and said magnets and shoes define a field structure that is relatively elongate in the direction parallel to the surface of said shoes and to a diameter of the armature and of minimum width in the direction transverse to the surfaces of said shoes, and including a commutator at one axial end of said armature and a brush assembly mounted at the corresponding end of said field structure, said brush assembly comprising two brushes and two brush holders mounted along the long dimension of said structure parallel to said surfaces of said shoes and to a diameter of the armature with each brush and brush holder situated adjacent and parallel to a respective one of said magnets, the dimension of each said magnet in the long dimesion of said structure accommodating a relatively long brush and a relatively long brush holder.

* * * * *